US009287692B1

(12) United States Patent
Grace

(10) Patent No.: US 9,287,692 B1
(45) Date of Patent: Mar. 15, 2016

(54) CABLE COVER PANEL

(71) Applicant: Dale Grace, Cordova, TN (US)

(72) Inventor: Dale Grace, Cordova, TN (US)

( * ) Notice: Subject to any disclaimer, the term of this patent is extended or adjusted under 35 U.S.C. 154(b) by 0 days.

(21) Appl. No.: 14/488,343

(22) Filed: Sep. 17, 2014

(51) Int. Cl.
H02G 3/08 (2006.01)
H02G 3/00 (2006.01)
E06B 3/30 (2006.01)

(52) U.S. Cl.
CPC . H02G 3/263 (2013.01); E06B 3/30 (2013.01)

(58) Field of Classification Search
CPC ........ E06B 3/30
USPC ........ 211/26, 26.2; 312/264, 248; 174/67, 66, 174/480, 481
See application file for complete search history.

(56) References Cited

U.S. PATENT DOCUMENTS 3,823,251 A * 7/1974 Heithecker et al. ........... 174/498
4,902,852 A * 2/1990 Wuertz ........................ 174/493
5,210,990 A * 5/1993 Kirk, Jr. ......................... 52/664
D345,499 S * 3/1994 Padilla .......................... D8/381
5,304,736 A * 4/1994 Halfacre ....................... 174/504
6,405,507 B1 * 6/2002 Milton et al. ................... 52/846
6,644,609 B1 * 11/2003 Scott ............................ 248/243
6,788,531 B2 * 9/2004 Chen ....................... 361/679.31
7,164,083 B1 * 1/2007 Carroll ........................... 174/67
7,219,392 B2 * 5/2007 Mullet et al. .................. 16/96 R
7,381,896 B2 6/2008 Park
7,459,633 B2 * 12/2008 Burns ........................ 174/72 A
7,910,829 B2 * 3/2011 Sculler et al. ............... 174/72 A
8,601,761 B2 * 12/2013 Chadwick ...................... 52/233
2009/0173702 A1 * 7/2009 Hung ............................. 211/26
2010/0187377 A1 * 7/2010 Hori ............................. 248/158
2012/0145654 A1 * 6/2012 McGowan et al. ............. 211/26
2012/0187056 A1 * 7/2012 Hazzard et al. ................. 211/26
2012/0261362 A1 * 10/2012 Skull et al. ...................... 211/26
2012/0305503 A1 * 12/2012 Smith et al. ..................... 211/26
2013/0206711 A1 * 8/2013 Whalen et al. .................. 211/26
2013/0299651 A1 * 11/2013 McGowan et al. ........... 248/201

* cited by examiner

Primary Examiner — Jerry Redman
(74) Attorney, Agent, or Firm — David J. Kreher

(57) ABSTRACT

This invention discloses a cable cover panel designed to hide exposed cables that are hanging from the tech drop to which the cable cover panel is to be attached.

10 Claims, 9 Drawing Sheets

CABLE COVER PANEL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

1. Field of the Invention

This invention relates to the addition of a cable cover panel onto a tech drop, between the tech drop and the desk system below, so that wires extending from the tech system down to the lower desk are hidden from view.

2. Background of the Invention

A tech drop is a piece of furniture that is attached to a wall to which a monitor is attached and includes power outlets and data connection ports. The power outlets and data connection ports have cables that extend from them behind the tech drop. These cables can be extended below the tech drop, where they are exposed and are unsightly. The present disclosure is a cable cover panel that attaches to the bottom of the tech drop and would extend to the top of the piece of furniture that is placed below the tech drop, thus hiding the cables from view. Attempts have been made to hide similar cables that extend from wall mounted electrical devices, however, the present disclosure can be distinguished from each.

In U.S. Pat. No. 7,381,896 Park discloses a wire hiding device that is attached to a wall, extends from the wall mounted electrical device to an area lower on the wall, and provides a channel through which wires are passed. The present disclosure is distinguishable from Park because the cable cover panel is attached to the tech drop, can be as long as the tech drop is wide, and its height extends from the tech drop to the piece of furniture below.

SUMMARY OF THE INVENTION

A tech drop is a piece of furniture that is attached to a wall to which a monitor is attached. The tech drop has built in power outlets and data connection ports to supply power and data to the monitor. Cables for the power outlets and data connection ports are hidden behind the tech drop but are exposed if the cables are extended beyond the body of the tech drop. Visible cables are unsightly. A cable cover panel is used to conceal cables that extend down from the tech drop by covering the gap between the tech drop and a piece of furniture below such as a desk or credenza.

The cable cover panel comprises a front plate, a left plate and a right plate. The exterior edge of the left plate is attached to the left end of the front plate by a plurality of attachment means. The exterior edge of the right plate is also attached to the right end of the front plate with a plurality of attachment means. The cable cover panel is then attached to the bottom edge of the tech drop by a plurality of fastening means and forms a gap behind which wires from the tech drop can be extended, hiding said wires from view. The height of the cable cover panel extends from the bottom of the tech drop to the surface of the piece of furniture above which the tech drop is positioned. The depth of the cable cover panel is sufficient to allow cables to pass behind the cable cover panel without compressing the cables, with a maximum depth equal to the depth of the bottom edge of the tech drop.

In one embodiment of the cable cover panel, the width of the cable cover panel is shorter than the length of the bottom edge of the tech drop and shorter than the length of the top of the piece of furniture above which the tech drop is positioned.

In a second embodiment of the cable cover panel, the width of the cable cover panel is shorter than the length of the bottom edge of the tech drop and the same length as the length of the top of the piece of furniture above which the tech drop is positioned.

In a third embodiment of the cable cover panel, the width of the cable cover panel is the same length as the bottom edge of the tech drop and the same width as the length of the top of the piece of furniture above which the tech drop is positioned.

In a fourth embodiment of the cable cover panel, the width of the cable cover panel is the same width as the length of the bottom edge of the tech drop and shorter than length of the top of the piece of furniture above which the tech drop is positioned.

In each of the embodiments of the cable cover panel, the inside left corner, where the front plate is assembled to the left plate, can be reinforced by a plurality of reinforcement means and the inside right corner, where the front plate is assembled to the right plate, can be reinforced by a plurality of reinforcement means.

DETAILED DESCRIPTION OF THE INVENTION

Figure 1:
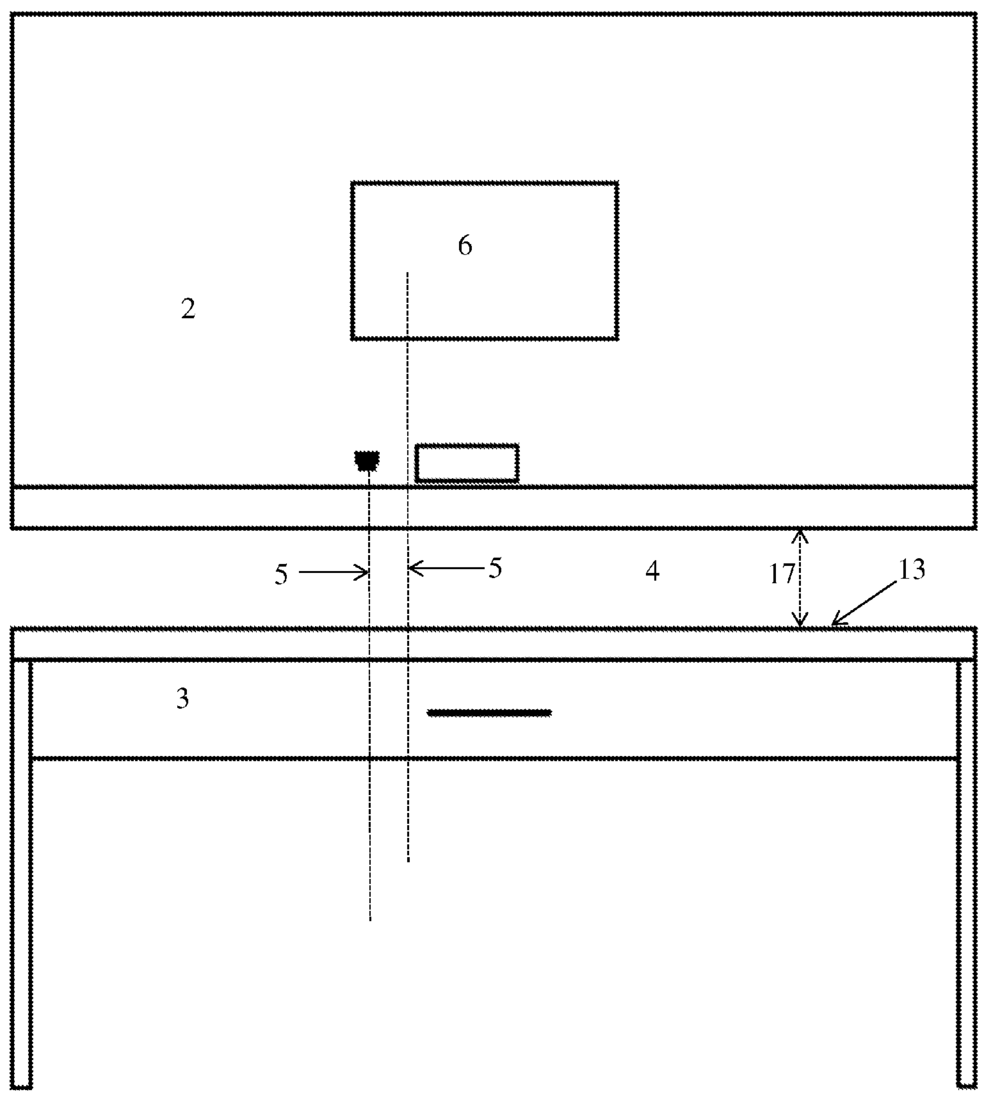
FIG. 1 is a view of a tech drop and the piece of furniture above which the tech drop is located, indicating the gap that exists between the tech drop and the piece of furniture.
Figure 2:
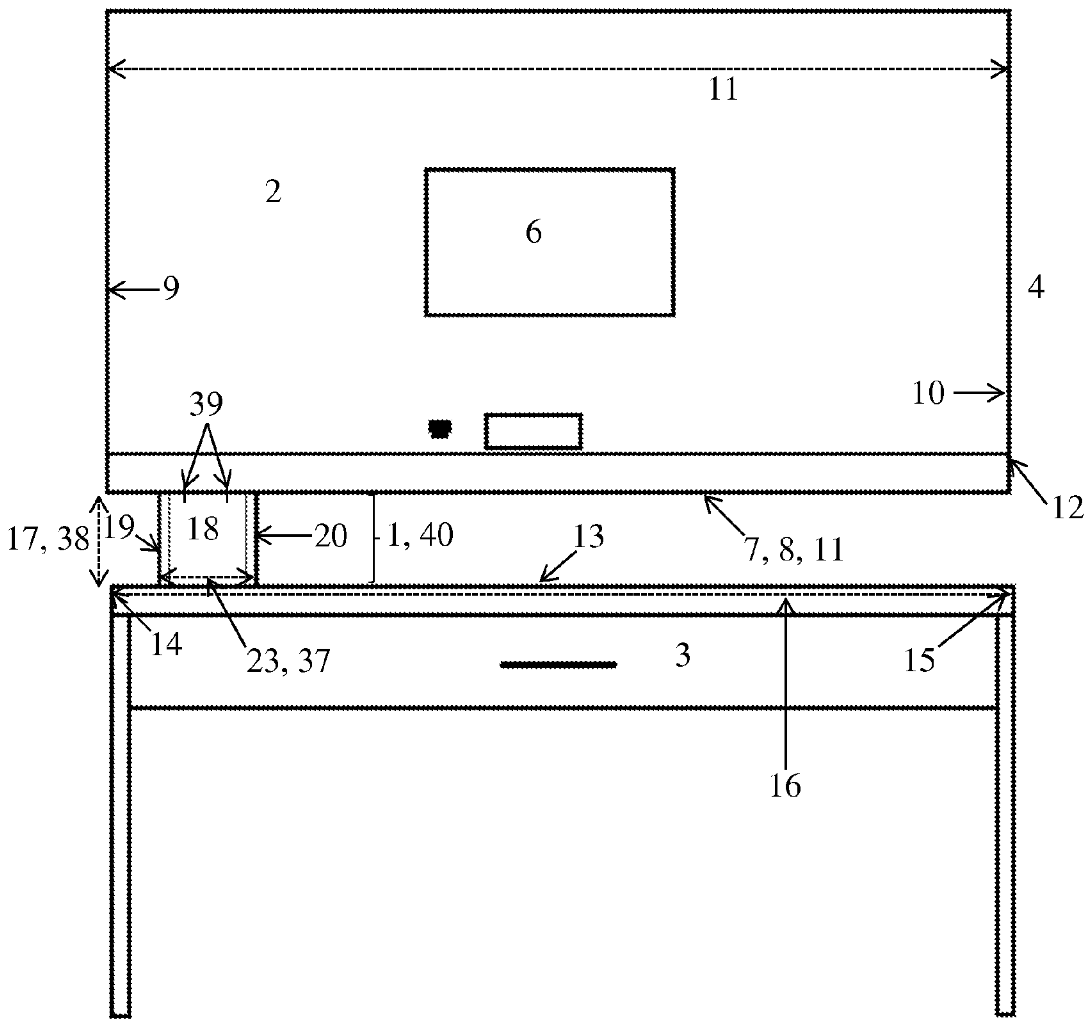
FIG. 2 is a view of the first embodiment of the cable cover panel attached to and beneath a tech drop where the width of the cable cover panel is shorter than the length of the bottom edge of the tech drop and shorter than the length of the top of the piece of furniture above which the tech drop is positioned.
Figure 3:
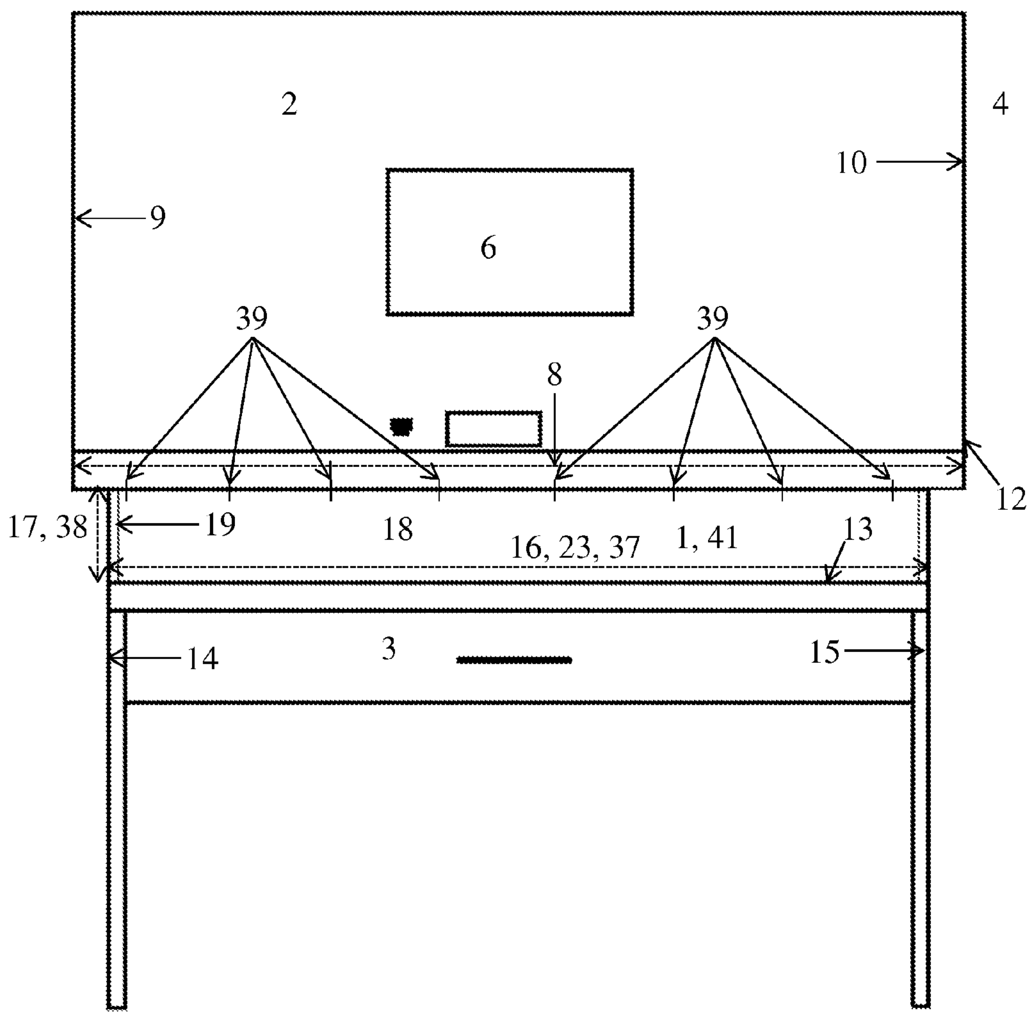
FIG. 3 is a view of the second embodiment of the cable cover panel attached to and beneath a tech drop where the width of the cable cover panel is shorter than the length of the bottom edge of the tech drop and the same length as the length as the length of the top of the piece of furniture above which the tech drop is positioned.
Figure 4:
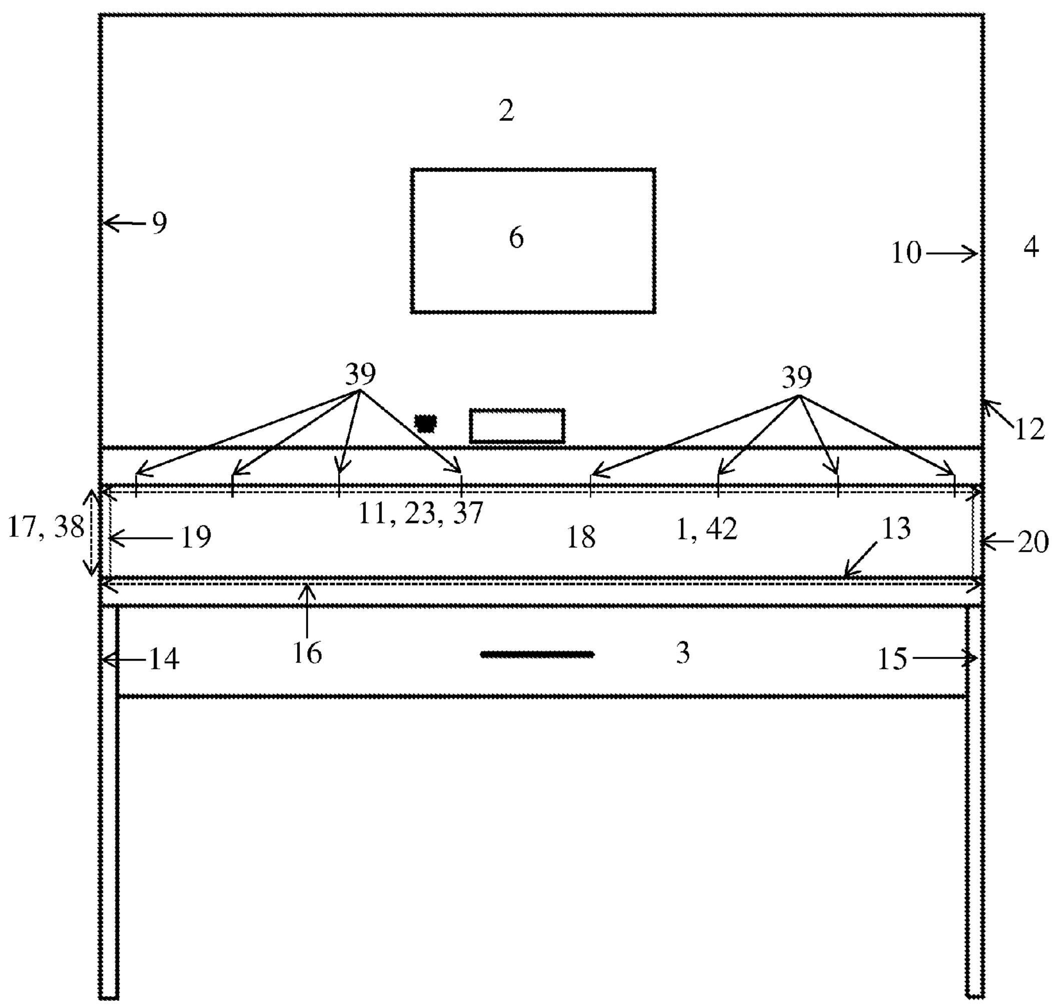
FIG. 4 is a view of the third embodiment of the cable cover panel attached to and beneath a tech drop where the width of the cable cover panel is the same length as the bottom edge of the tech drop and the same width as the piece of furniture above which the tech drop is positioned.
Figure 5:
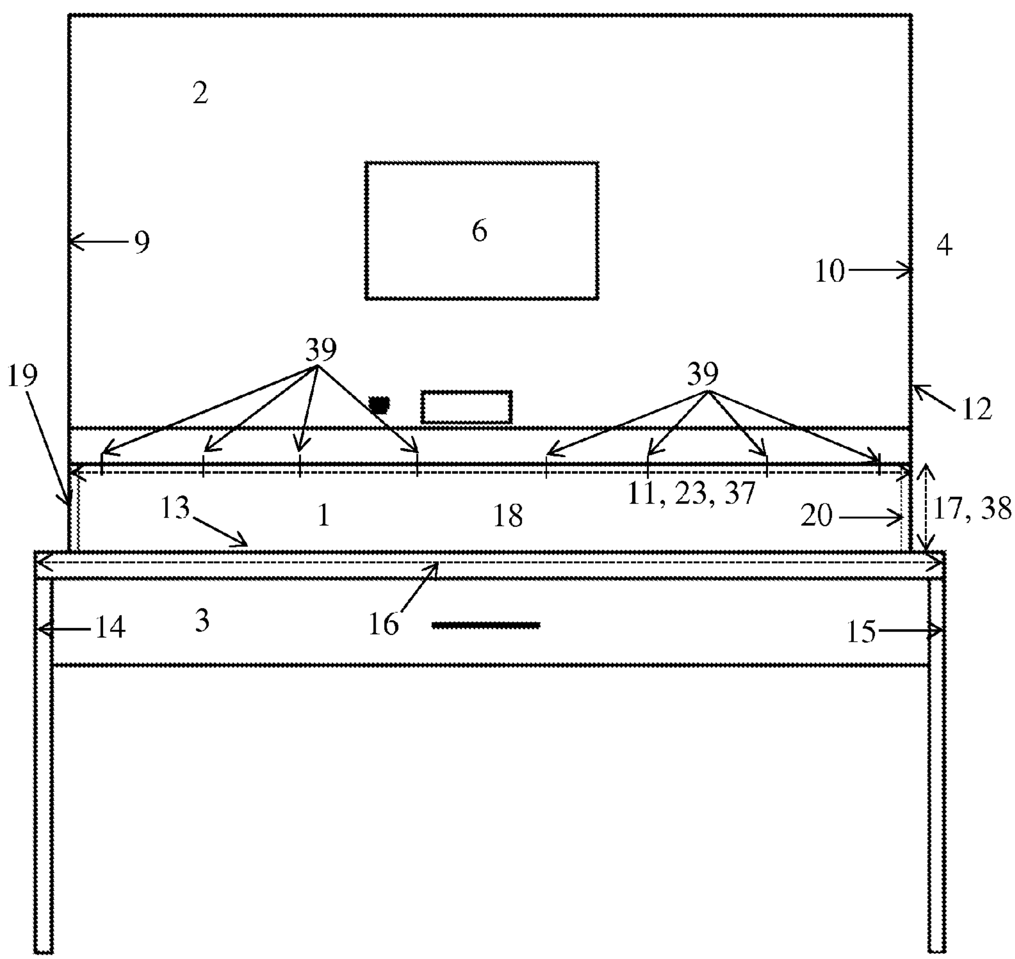
FIG. 5 is a view of the fourth embodiment of the cable cover panel attached to and beneath a tech drop where the width of the cable cover panel is the same as the length of the bottom edge of the tech drop and the shorter than length as the length of the top of the piece of furniture above which the tech drop is positioned.
Figure 6:
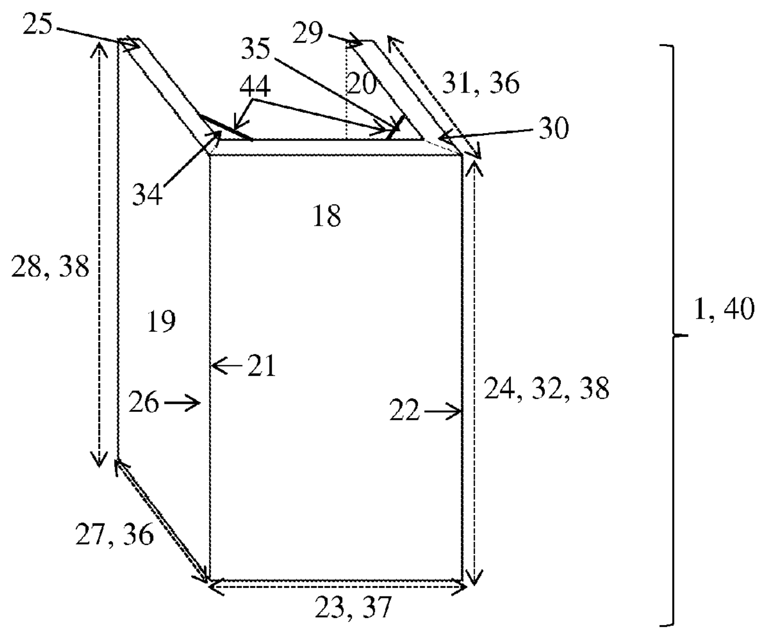
FIG. 6 is a perspective view of the first embodiment of the cable cover panel where the width of the cable cover panel is shorter than the length of the bottom edge of the tech drop and shorter than the length of the top of the piece of furniture above which the tech drop is positioned.
Figure 7:
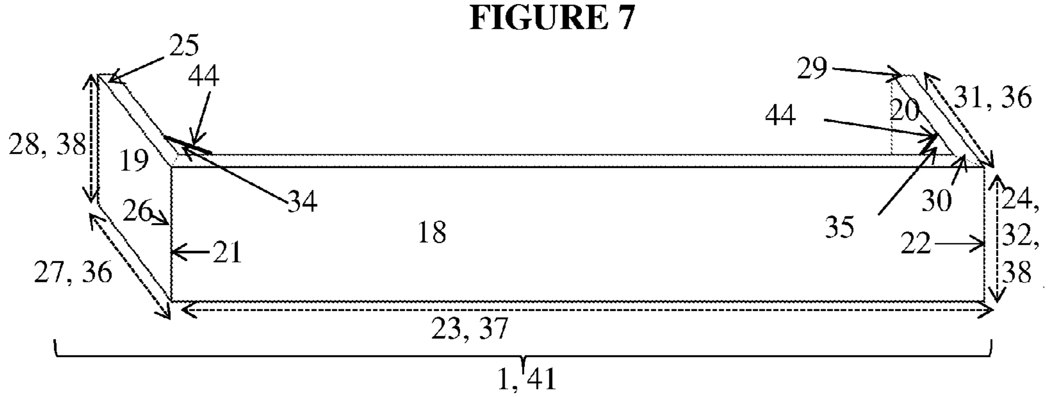
FIG. 7 is a perspective view of the second embodiment of the cable cover panel where the width of the cable cover panel is shorter than the length of the bottom edge of the tech drop and the same as the length of the piece of furniture above which the tech drop is positioned.
Figure 8:
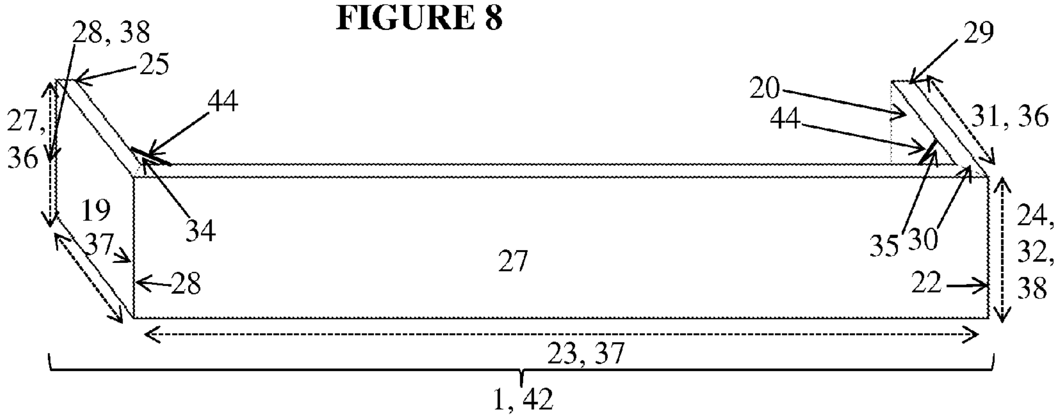
FIG. 8 is a perspective view of the third embodiment of the cable cover panel where the width of the cable cover panel is the same length as the bottom edge of the tech drop and the same as the length of the piece of furniture above which the tech drop is positioned.
Figure 9:
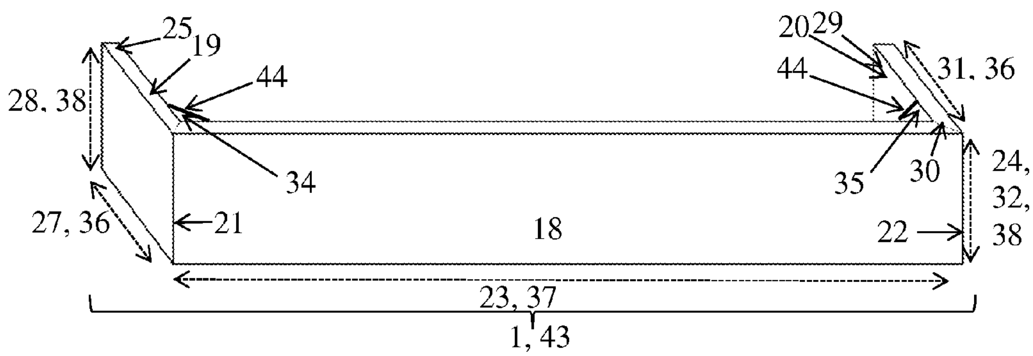
FIG. 9 is a perspective view of the fourth embodiment of the cable cover panel where the width of the cable cover panel is the same length as the bottom edge of the tech drop and shorter than the piece of furniture above which the tech drop is positioned.
Figure 10:
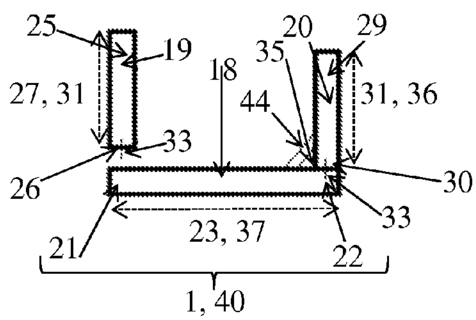
FIG. 10 is top view of the first embodiment of the cable cover panel where the width of the cable cover panel is shorter than the length of the bottom edge of the tech drop and shorter than the length of the top of the piece of furniture above which the tech drop is positioned, indicating the front plate, left plate, right plate, the plurality of fastening means used to attached the cable cover panel to the tech drop, a plurality of attachment means used to attach the left plate to the front plate, and a plurality of attachment means used to attach the right plate to the front plate.
Figure 11:
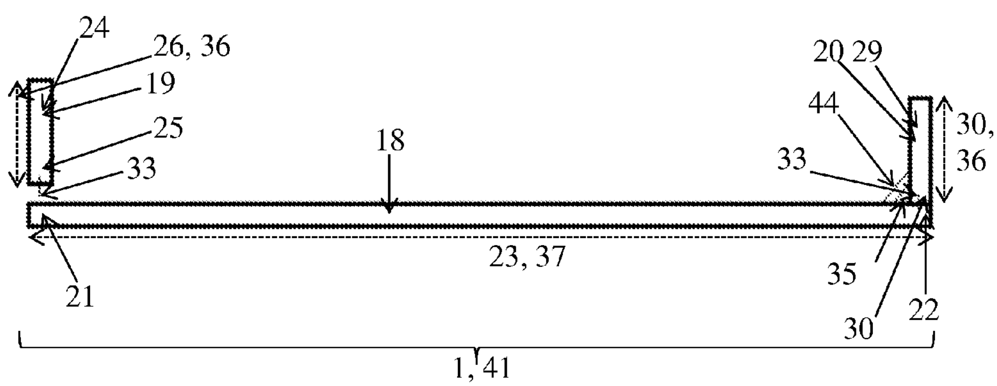
FIG. 11 is top view of the second embodiment of the cable cover panel where the width of the cable cover panel is shorter than the length of the bottom edge of the tech drop and the same as the length of the top of the piece of furniture above which the tech drop is positioned, indicating the front plate, left plate, right plate, the plurality of fastening means used to attached the cable cover panel to the tech drop, a plurality of attachment means used to attach the left plate to the front plate, and a plurality of attachment means used to attach the right plate to the front plate.
Figure 12:
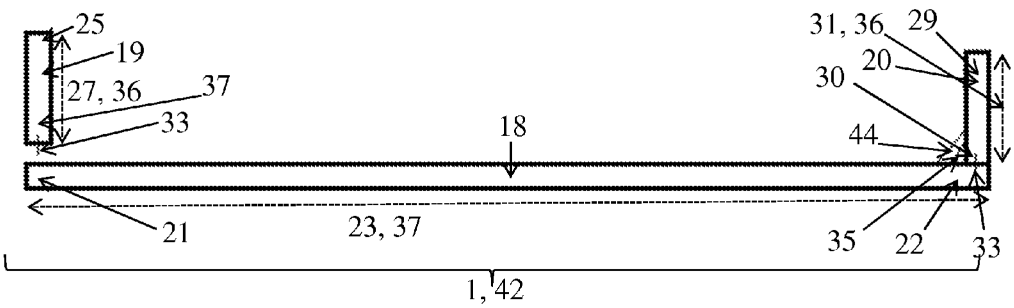
FIG. 12 is top view of the third embodiment of the cable cover panel where the width of the cable cover panel is the same length as the bottom edge of the tech drop and the same as the length of the piece of furniture above which the tech drop is positioned, indicating the front plate, left plate, right plate, a plurality of reinforcement means located on the inside left corner of the cable cover panel, and a plurality of reinforcement means located on the inside right corner of the cable cover panel.
Figure 13:
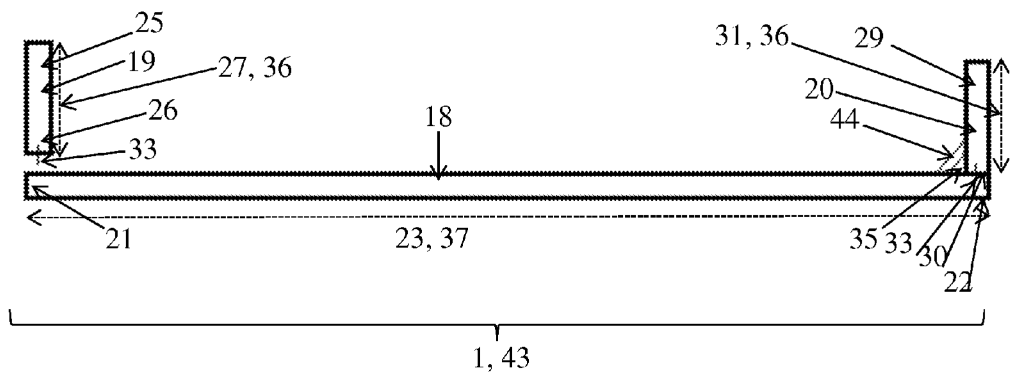
FIG. 13 is top view of the fourth embodiment of the cable cover panel where the width of the cable cover panel is the same length as the bottom edge of the tech drop and shorter than the piece of furniture above which the tech drop is positioned, indicating the front plate, left plate, right plate, a plurality of reinforcement means located on the inside left corner of the cable cover panel, and a plurality of reinforcement means located on the inside right corner of the cable cover panel.

The present disclosure reveals a cable cover panel 1 positioned between a tech drop 2 and a separate piece of furniture 3 wherein the tech drop 2 is attached to a wall 4 and positioned above the cable cover panel 1 and the separate piece of furniture 3 positioned below the cable cover panel 1. The cable cover panel 1 extends from the tech drop 2 above to the piece of furniture 3 below for the purpose of hiding the exposed plurality of cables 5 that are extending from behind the tech drop 2.

The tech drop 2 holds at least a monitor 6 with a plurality of cables 5 extending therefrom and comprises a front edge 7, a bottom edge 8, a left edge 9, a right edge 10, a length 11 of the bottom edge that extends from the left edge 9 to the right edge 10, and a depth 12 that extends from the wall 4 to front edge 7. The piece of furniture 3 positioned below the cable cover panel 1 and tech drop 2 comprises a top 13, a left edge 14, a right edge 15, and a length 16 of the piece of furniture 3 that extends from the left edge 14 of the piece of furniture 3 to the right edge 15 of the piece of furniture 3. There is a gap 17 between the tech drop 2 and the piece of furniture 3 into which the cable cover panel 1 resides.

The cable cover panel 1 comprises a front plate 18, a left plate 19, and a right plate 20. The front plate 18 of the cable cover panel 1 comprises a left end 21, a right end 22, a length 23, and a height 24. The left plate 19 of the cable cover panel 1 comprises an interior edge 25, an exterior edge 26, a length 27, and a height 28. The right plate 20 of the cable cover panel 1 comprises an interior edge 29, an exterior edge 30, a length 31, and a height 32. The interior edge 25 of the left plate 19 abuts against the wall 4 to which the tech drop 2 is attached. The exterior edge 26 of the left plate 19 is attached to the left end 21 of the front plate 18 by a plurality of attachment means 33, wherein the exterior edge 26 of the left plate 19 being attached to the left end 21 of the front plate 18 defines the inside left corner 34 of the cable cover panel 1. The interior edge 29 of the right plate 20 abuts against the wall 4 to which the tech drop 2 is attached. The exterior edge 30 of the right plate 20 is attached to the right end 22 of the front plate 18 by a plurality of attachment means 33, wherein the exterior edge 30 of the right plate 20 being attached to the right end 22 of the front plate 18 define the inside right corner 35 of the cable cover panel 1.

The length 23 of the left plate 19 and length 31 of the right plate 20 define how far the front plate 18 is positioned away from the wall 4, which establishes a depth 36 of the cable cover panel 1. The front plate 18 has a length 23 that defines a width 37 of the cable cover panel 1. The depth 36 of the cable cover panel 1 is sufficient to allow the plurality of cables 5 to pass behind said cable cover panel 1 without compressing the plurality of cables 5, with a maximum depth 36 equal to the depth 12 of the bottom edge 8 of the tech drop 2 to which the cable cover panel 1 will be below.

The height 28 of the left plate 19, the height 32 of the right plate 20 and the height 24 of the front plate 18 establish the height 38 of the cable cover panel 1, wherein the height 38 of said cable cover panel 1 is equal to the gap 17, or rather, distance between the tech drop 2 and the piece of furniture 3 above which the tech drop 2 is positioned. The cable cover panel 1 is attached to the bottom edge 8 of the tech drop 2 by a plurality of fastening means 39.

The first embodiment 40 of the cable cover panel 1 occurs wherein the width 37 of the cable cover panel 1 is shorter than the length 11 of the bottom edge of the tech drop 2 to which the cable cover panel 1 is positioned below and shorter than the length 16 of the top 13 of the piece of furniture 3 above which the cable cover panel 1 is positioned.

The second embodiment 41 of the cable cover panel 1 occurs wherein the width 37 of the cable cover panel 1 is shorter than the length 11 of the bottom edge 8 of the tech drop 2 to which the cable cover panel 1 is positioned below and the same as the length 16 of the top 13 of the piece of furniture 3 above which the cable cover panel 1 is positioned.

The third embodiment 42 of the cable cover panel 1 occurs wherein the width 37 of the cable cover panel 1 is the same as the length 11 as the bottom edge 8 of the tech drop 2 to which the cable cover panel 1 is positioned below and the same as length 16 of the top 13 of the piece of furniture 3 above which the cable cover panel 1 is positioned.

The fourth embodiment 43 of the cable cover panel 1 occurs wherein the width 37 of the cable cover panel 1 is the same as the length 11 as the bottom edge 8 of the tech drop 2 to which the cable cover panel 1 is positioned below and less than the length 16 of the top 13 of the piece of furniture 3 above which the cable cover panel 1 is positioned.

The inside left corner 34 of the cable cover panel 1 and the inside right corner 35 of the cable cover panel 1 for each of the embodiments 40, 41, 42 may be reinforced by a plurality of reinforcement means 43.

What is claimed:

1. A cable cover panel in association with a tech drop attached to a wall and positioned above the cable cover panel and a separate piece of furniture positioned below the tech drop and the cable cover panel such that the cable cover panel extends from the tech drop above to the piece of furniture below for the purpose of hiding exposed cables that are extending from behind the tech drop comprising:

a tech drop mounted to a wall that holds at least a monitor with cabling extending therefrom comprising a front edge, a bottom edge, a left edge a right edge, a length of the bottom edge that extends from the left edge to the right edge, and a depth that extends from the wall to front edge;

a piece of furniture positioned below and not attached to the tech drop with a top, a left edge a right edge, and a length of the piece of furniture that extends from the left edge of the piece of furniture to the right edge of the piece of furniture;

a gap between the tech drop and the piece of furniture;

a cable cover panel comprising front plate, a left plate, and a right plate;

the front plate comprising a left end, a right end, a length, and a height;

the left plate comprising an interior edge, an exterior edge, a length, and a height;

the right plate comprising an interior edge, an exterior edge, a length, and a height;

the interior edge of the left plate abuts against the wall to which the tech drop is attached, the exterior edge of the left plate is attached to the left end of the front plate by a plurality of attachment means, wherein the exterior edge of the left plate being attached to the left end of the front plate defines the inside left corner of the cable cover panel;

the interior edge of the right plate abuts against the wall to which the tech drop is attached and the the exterior edge of the right plate being attached to the right end of the front plate by a plurality of attachment means, wherein the exterior edge of the right plate being attached to the right end of the front plate define the inside right corner of the cable cover panel;

the length of the left plate and length of the right plate defining how far the a front plate is positioned away from the wall, which establishes the depth of the cable cover panel and the front plate having a length that defines a width of the cable cover panel;

the depth of said cable cover panel is sufficient to allow cables to pass behind said cable cover panel without compressing the cables, with a maximum depth equal to the depth of the bottom edge of the tech drop to which the cable cover panel will be below;

the height of the left plate, the height of the right plate and the height of the front plate establish the height of the cable cover panel, wherein the height of said cable cover panel is equal to the gap, or rather, distance between the tech drop and the piece of furniture above which the tech drop is positioned; and where said cable cover panel is attached to the bottom edge of the tech drop by a plurality of fastening means.

2. The cable cover panel of claim 1 wherein the inside left corner of the cable cover panel is reinforced by a plurality of reinforcement means and wherein the inside right corner of the cable cover panel is reinforced by a plurality of reinforcement means.

3. The cable cover panel of claim 1, wherein the width of the cable cover panel is shorter than the length of the bottom edge of the tech drop to which the cable cover panel is positioned below and shorter than the length of the top of the piece of furniture above which the cable cover panel is positioned.

4. The cable cover panel of claim 3 wherein the inside left corner of the cable cover panel is reinforced by a plurality of reinforcement means and wherein the inside right corner of the cable cover panel is reinforced by a plurality of reinforcement means.

5. The cable cover panel of claim 1 wherein the width of the cable cover panel is shorter than the length of the bottom edge of the tech drop to which the cable cover panel is positioned below and the same as the length of the top of the piece of furniture above which the cable cover panel is positioned.

6. The cable cover panel of claim 5 wherein the inside left corner of the cable cover panel is reinforced by a plurality of reinforcement means and wherein the inside right corner of the cable cover panel is reinforced by a plurality of reinforcement means.

7. The cable cover panel of claim 1 wherein the width of the cable cover panel is the same length as the bottom edge of the tech drop to which the cable cover panel is positioned below and the same as the top of the piece of furniture above which the cable cover panel is positioned.

8. The cable cover panel of claim 7 wherein the inside left corner of the cable cover panel is reinforced by a plurality of reinforcement means and wherein the inside right corner of the cable cover panel is reinforced by a plurality of reinforcement means.

9. The cable cover panel of claim 1 wherein the width of the cable cover panel is the same length as the bottom edge of the tech drop to which the cable cover panel is positioned below and less than the top of the piece of furniture above which the cable cover panel is positioned.

10. The cable cover panel of claim 9 wherein the inside left corner of the cable cover panel is reinforced by a plurality of reinforcement means and wherein the inside right corner of the cable cover panel is reinforced by a plurality of reinforcement means.

* * * * *